US010645553B2

(12) United States Patent
Lee et al.

(10) Patent No.: US 10,645,553 B2
(45) Date of Patent: May 5, 2020

(54) METHOD AND APPARATUS FOR PROCESSING SIGNAL IN A MOBILE DEVICE

(71) Applicant: Samsung Electronics Co., Ltd., Suwon-si (KR)

(72) Inventors: Dae Young Lee, Seongnam-si (KR); Jae-Hwa Kim, Hwaseong-si (KR); Il-Suk Ko, Seoul (KR); Myung-Ha Kuh, Suwon-si (KR); Jae-Hyon Kim, Suwon-si (KR); Won-Ki Kim, Suwon-si (KR); Hyun-Moo Kim, Seongnam-si (KR); Seung-Pyo Hong, Suwon-si (KR)

(73) Assignee: Samsung Electronics Co., Ltd (KR)

( * ) Notice: Subject to any disclaimer, the term of this patent is extended or adjusted under 35 U.S.C. 154(b) by 55 days.

(21) Appl. No.: 14/986,390

(22) Filed: Dec. 31, 2015

(65) Prior Publication Data
US 2016/0192360 A1 Jun. 30, 2016

(30) Foreign Application Priority Data
Dec. 31, 2014 (KR) .................. 10-2014-0194748

(51) Int. Cl.
*H04B 3/00* (2006.01)
*H04W 4/70* (2018.01)
*H04W 52/02* (2009.01)

(52) U.S. Cl.
CPC ......... *H04W 4/70* (2018.02); *H04W 52/0225* (2013.01); *Y02D 70/164* (2018.01); *Y02D 70/21* (2018.01); *Y02D 70/22* (2018.01)

(58) Field of Classification Search
CPC ... H04W 4/005; H04W 52/0225; Y02B 60/50
See application file for complete search history.

(56) References Cited

U.S. PATENT DOCUMENTS 6,831,480 B1 * 12/2004 Shumarayev ........ H03K 19/177
326/37
2005/0195922 A1 9/2005 Maeda et al.
(Continued)

FOREIGN PATENT DOCUMENTS

| CN | 1652472 | 8/2005 |
| CN | 205490533 | 8/2016 |

OTHER PUBLICATIONS

Chinese Office Action dated Jan. 28, 2019 issued in counterpart application No. 201511021632.7, 19 pages.

*Primary Examiner* — Luat Phung
(74) *Attorney, Agent, or Firm* — The Farrell Law Firm, P.C.

(57) ABSTRACT

The present disclosure relates to a sensor network, Machine Type Communication (MTC), Machine-to-Machine (M2M) communication, and technology for Internet of Things (IoT). The present disclosure may be applied to intelligent services based on the above technologies, such as smart home, smart building, smart city, smart car, connected car, health care, digital education, smart retail, security and safety services. A method and apparatus for processing a signal in a mobile device are provided. The method includes classifying signals transmitted and received between devices according to at least two predetermined rates, and transmitting and receiving the classified signals in connection lines supporting the at least two rates, respectively.

16 Claims, 19 Drawing Sheets

(56) References Cited

U.S. PATENT DOCUMENTS

| | | | |
|---|---|---|---|
| 2006/0161948 A1* | 7/2006 | Hwa | G06F 3/1446 |
| | | | 725/37 |
| 2008/0117994 A1 | 5/2008 | Shetty | |
| 2009/0201326 A1 | 8/2009 | Komori et al. | |
| 2009/0251608 A1* | 10/2009 | Kato | G06F 3/14 |
| | | | 348/564 |
| 2016/0192360 A1 | 6/2016 | Lee et al. | |

* cited by examiner

METHOD AND APPARATUS FOR PROCESSING SIGNAL IN A MOBILE DEVICE

RELATED APPLICATION(S)

This application claims the benefit under 35 U.S.C. § 119(a) of a Korean patent application filed in the Korean Intellectual Property Office on Dec. 31, 2014 and assigned Serial No. 10-2014-0194748, the entire disclosure of which is incorporated herein by reference.

BACKGROUND

The present disclosure relates to a mobile device, and more particularly, to a method and apparatus for processing signals in a mobile device.

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a Machine-to-Machine (M2M) communication, Machine Type Communication (MTC), and so forth have been recently researched.

Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

Since many components are combined to support various functions and performances in mobile devices for IoT implementation, the demand for high-rate data transmission between chips or devices in a mobile device has been increasing. For example, the resolution of some display devices in mobile devices have increased from full high definition (FHD) to quad HD (QHD), and an image sensor can also support a resolution of 1.3 million pixels with 10 million pixels or more not being uncommon. In addition, mobile devices can now use accessories requiring signal transmission in a high frequency band to use a camera or a display. To transmit such a signal in a high frequency band between chips or devices, the mobile industry processor interface (MIPI) standard that defines interfaces between components of a mobile device is widely used.

FIG. 1 illustrates exemplary interfaces defined for respective usages in a general mobile device conforming to the MIPI standard.

For convenience of description, a simplified configuration of a mobile device 100 is shown in FIG. 1. Referring to FIG. 1, the mobile device 100 may include an application processor (AP) 102 for controlling overall signal processing, a modem 104, and a radio frequency integrated circuit (RFIC) 106, and may be connected to additional devices supporting various performances and functions. For example, the MIPI standard defines a display serial interface (DSI) as an interface for a display unit 108 and a camera serial interface (CSI) as an interface for a camera 110. Links may also be established for a microphone 112 and a speaker 114 through the modem 104 and serial low-power inter-chip media bus (SLIMbus). Further, sensors 120 or a battery 122 may be mounted in the mobile device. Each device may transmit and receive signals to and from the AP 102 via an interface defined for the device.

MIPI standard mainly uses serialization for an interface between internal devices in a mobile device. Hardware configurations are simplified by serialization, and differential pairing can be used to enable robust implementation for a high data rate interface. MIPI has defined D-PHY and M-PHY as physical layers for data communication within a mobile device, and they are implemented as differential serial interfaces. Because of limitations in transmitting a high-bandwidth signal with the physical layer (PHY) specification, high-bandwidth signals are handled by increasing the number of physical lanes.

The trend for mobile devices is that additional devices or sensors, such as a heartbeat sensor or a humidity sensor, are used in addition to devices commonly included such as a global positioning system (GPS) sensor or an accelerometer. Control signals for these additional devices have a narrower bandwidth than video or image signals. However, each additional device has a separate lane for control signals to allow for better control of each additional device. Accordingly, the number of lanes for control signals may be awkward to manage as the number of internal devices increase.

The number of physical lanes for interfaces between chips or devices in a mobile device has been increasing for the above-described reasons, and interference between physical lanes leads to many problems in terms of signal integrity, electro-magnetic interference (EMI), and chip layout for physical connections.

The above information is presented as background information only to assist with an understanding of the present disclosure. No determination has been made, and no assertion is made, as to whether any of the above might be applicable as prior art with regard to the present disclosure.

SUMMARY

An aspect of the present disclosure is to address at least the above-mentioned problems and/or disadvantages and to provide at least the advantages described below. Accordingly, an aspect of the present disclosure is to describe a configuration and operation of a device for efficiently reducing the number of physical connection lines for signal processing in a mobile device.

In accordance with an aspect of the present disclosure, there is provided a method for classifying a type of signal as a classified signal, where the classification is to one of at least two predetermined rates for communicating the classified signal between devices in the mobile device. The classified signal may be communicated via a connection line supporting one of the two or more rates.

The two rates may include a first rate satisfying a predetermined condition and a second rate higher than the first rate, where the connection line supporting the first rate supports bidirectional communication. The classified signal may be communicated in the connection line supporting the first rate.

A first device may transmit a switching signal, indicating change in communication direction in the connection line supporting the first rate, to a second device prior to the first device transmitting the classified signal on the connection line. The switching signal may be transmitted by use of a separate channel or by a signal having a predetermined pattern.

The connection line may support differential signaling and/or common transmission mode signaling, and at least one device may receive DC power via the connection line to which common transmission mode signaling is applied.

One of a plurality of clock signals may be selected as a communication clock for use in communicating the classified signal, and the communication clock may be the slowest of the plurality of the clock signals that can be used communicating the classified signal. Selecting the communication clock may happen periodically or upon a change in a communication state, where the change in the communication state comprises determining whether another of the predetermined rates not being presently used needs to be used.

The classified signal may be a signal that used a legacy protocol.

In accordance with another aspect of the present disclosure, there is provided a mobile device for processing a signal. The mobile device includes a controller configured to classify a type of signal as a classified signal. The type of signal may be classified to one of at least two predetermined mates for communicating the classified signal between devices in the mobile device. A transceiver may be configured to communicate the classified signal in a connection line supporting one of the two or more rates.

The one or more rates may comprise two a first rate satisfying a predetermined condition and a second rate higher than the first rate, and where a connection line supporting the first rate supports bidirectional communication.

The mobile device may include a converter configured to convert the classified signal, which comprises parallel signals, to a serial signal prior to transmitting on the connection line, and convert a serial signal received on the connection line to parallel signals.

A first of the devices may transmit a switching signal indicating change in communication direction in the connection line supporting the first rate to a second of the devices prior to the first device transmitting data on the connection line, wherein the switching signal is transmitted by use of at least one of a separate channel and a signal having a predetermined pattern.

The transmission line may support differential signaling and/or common transmission mode signaling, and at least one of the devices may receive DC power via the connection line.

One of a plurality of clock signals may be selected as a communication on clock for use in communicating the classified signals, and the communication clock may be selected periodically and/or upon a change in a communication state, where the change in the communication state may include determining whether to use another of the two or more predetermined rates not being presently used. The communication clock, of the plurality of the clock signals, may be the slowest that can be used in communicating the classified signals.

The classified signals may comprise a legacy protocol signal to one of the two or more rates.

Other aspects, advantages, and salient features of the disclosure rill become apparent to those skilled in the art from the following detailed description, which, taken in conjunction with the annexed drawings, discloses exemplary embodiments of the disclosure.

BRIEF DESCRIPTION OF THE DRAWINGS

The above and other aspects, features and advantages of certain exemplary embodiments of the present disclosure will be more apparent from the following description taken in conjunction with the accompanying drawings, in which.

Throughout the drawings, like reference numerals will be understood to refer to like parts, components, and structures.

DETAILED DESCRIPTION

Preferred embodiments of the present disclosure will be described below in detail with reference to the attached drawings. A detailed description of a known function or structure will not be provided herein lest it obscures the subject matter of the present disclosure. The terms used in the following description are defined in consideration of their functions in the present disclosure and may vary according to the intent of a user or an operator. Therefore, the present disclosure should be defined by the appended claims and their equivalents.

Embodiments of the present disclosure provide a method and apparatus for minimizing the number of connection lines for signals transmitted and received within a mobile device in order to perform functions and services for the mobile device. Accordingly, various embodiments of the disclosure may classify signals in a mobile device to one of a plurality of transmission rates, and these signals may use different transmission (or connection) lines depending on their assigned transmission rates. Generally, the term "transmission" line may refer to a plurality of transmission lines. For example, when a differential signal is sent via a transmission line, it should be understood that there are 2 transmission lines. Various embodiments of the present disclosure may be applicable to a mobile device such as, for example, a smart phone, a tablet personal computer (PC), or the like.

Figure 1:
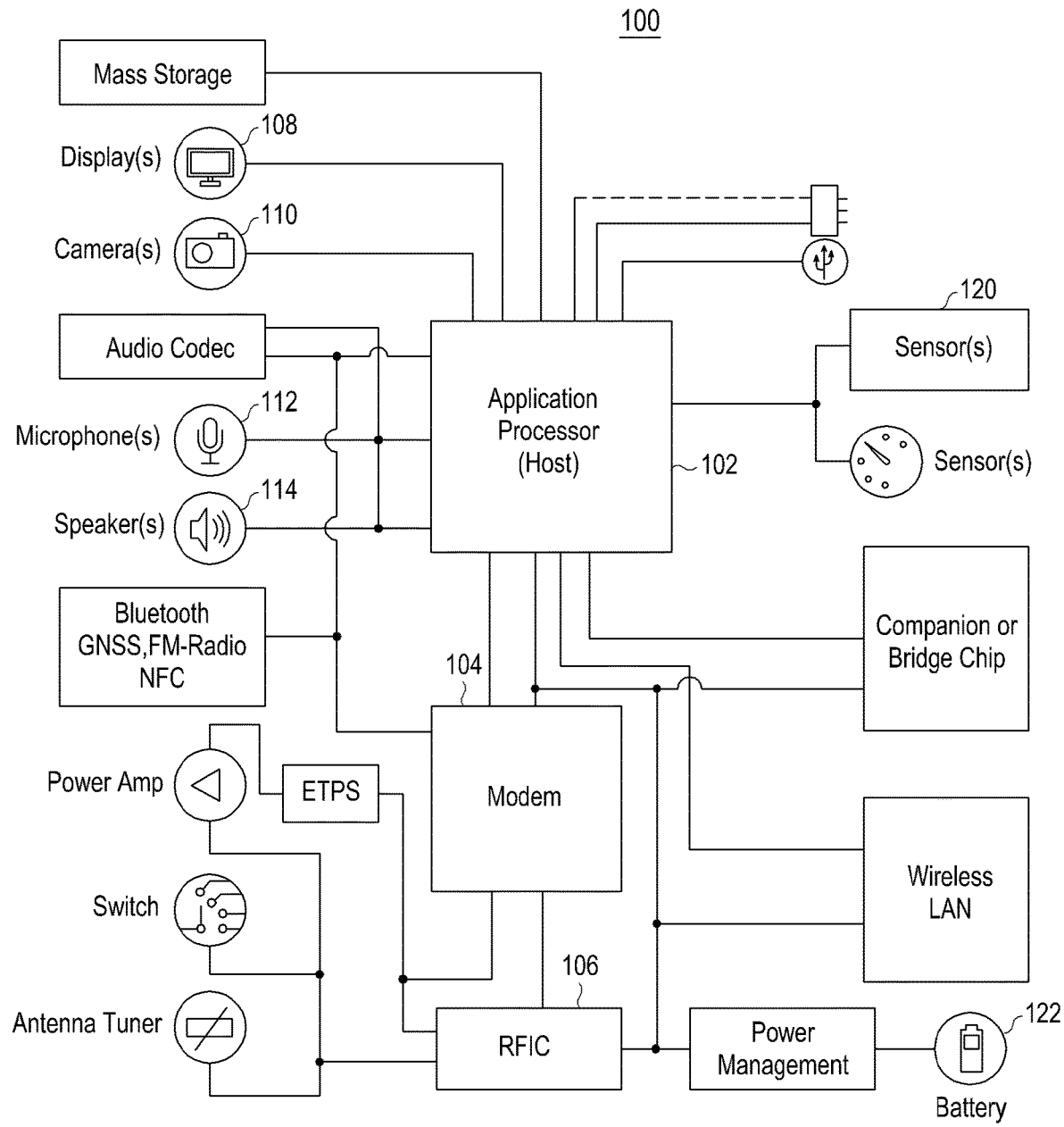
FIG. 1 illustrates exemplary interfaces defined for respective usages in a general mobile device conforming to the mobile industry processor interface (MIPI) standard.
Figure 2A:
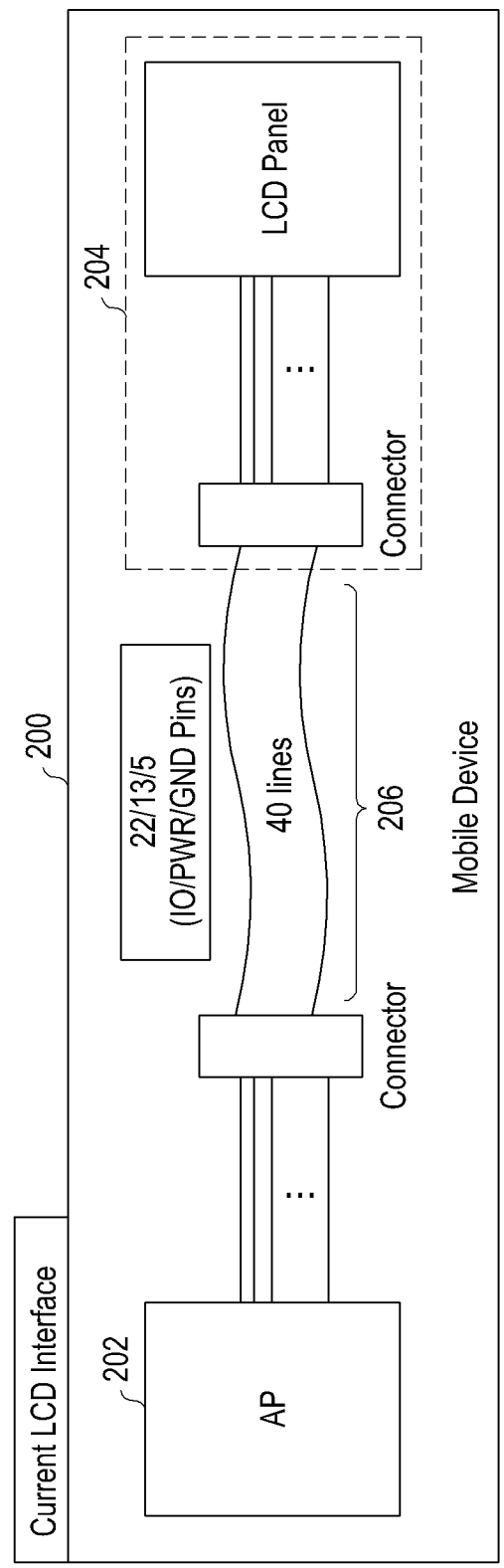
FIG. 2A is a block diagram illustrating an exemplary configuration of a general mobile device.

FIG. 2A is a block diagram illustrating an exemplary configuration of a general mobile device.

Referring to FIG. 2A, there is shown an exemplary configuration of an interface between a liquid crystal display (LCD) panel 204 and an application processor (AP) 202, which are examples of additional devices mountable in a mobile device 200. The AP 202 executes an operating system (OS) and applications for the mobile device 200, and controls interfaces with a plurality of additional devices. In other words, the AP 202 may be responsible for overall processing of signals transmitted and received within the mobile device 200. The AP 202 may be installed as a system on chip (SOC) within the mobile device 200. As illustrated in FIG. 2A, for example, a cable 206 comprising a total of 40 wires may be installed for communication between the AP 202 and the LCD panel 204. While the cable 206 is described as comprising "wires," it should be understood that a "wire" refers to a conductor. Accordingly, a wire may be an actual wire or a trace on a printed circuit board, etc. Similarly, the term "cable" refers to one or more wires.

Figure 2B:
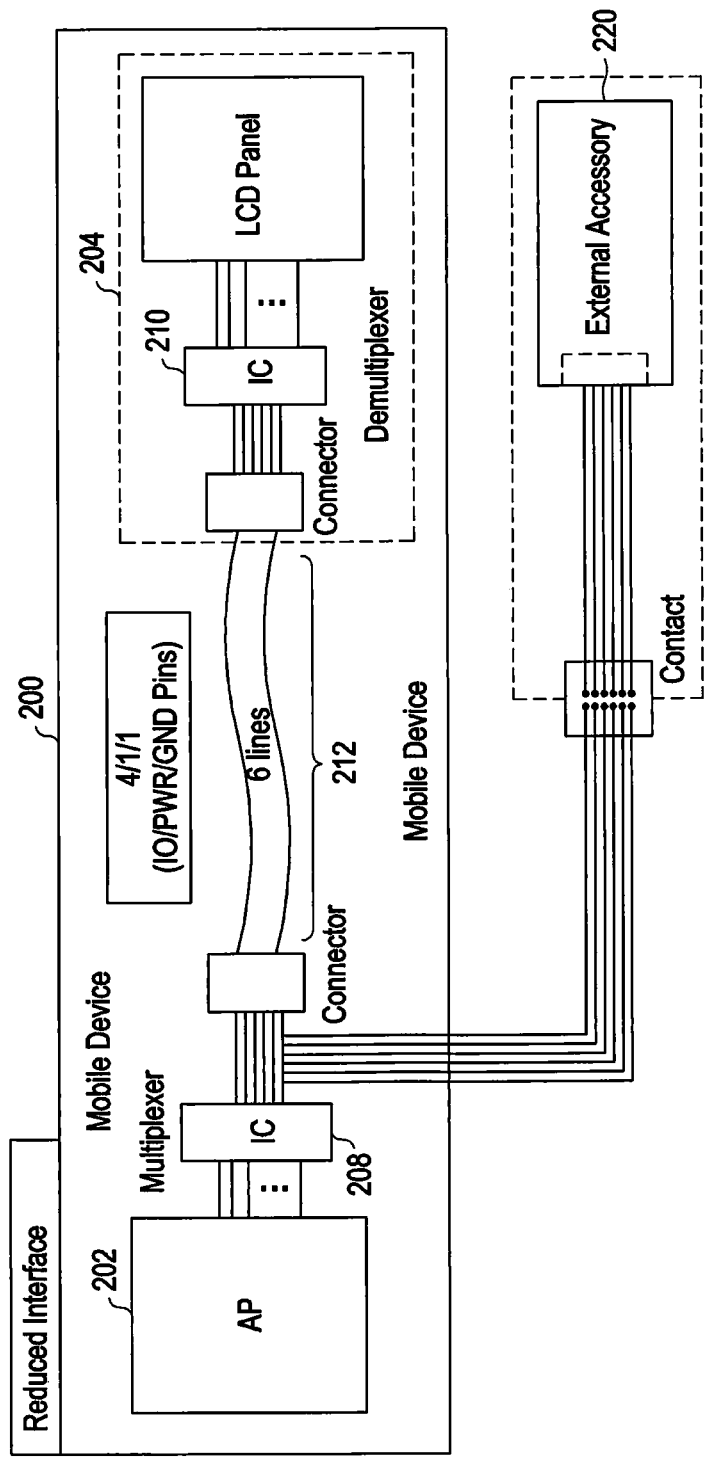
FIG. 2B is a block diagram illustrating a configuration for the mobile device of FIG. 2A according to an embodiment of the present disclosure.

FIG. 2B is a block diagram illustrating a configuration for the mobile device of FIG. 2A according to an embodiment of the present disclosure.

Referring to FIG. 2B, the mobile device 200 includes a multiplexer 208 connected to at least some of the connection lines of the AP 202 and a demultiplexer 210 connected to connection lines of the LCD panel 204. The connection lines are the input/output (I/O) lines to/from a device. The multiplexer 208 may allow the AP 202 to communicate with various internal devices, such as the LCD panel 204, as well as external devices such as the external accessory 220 connected to the mobile device 200.

Each of the multiplexer 208 and the demultiplexer 210 classifies signals in the connection lines to a transmission rate based on a predetermined criterion and connects the signals to various devices using, for example, six wires in the cable 212. These 6 wires are far fewer than the 40 wires that may be typically used in the interface illustrated in FIG. 2A. However, it should be noted that the number of connection lines between the AP and another device is purely exemplary in FIGS. 2A and 2B. Thus, embodiments of the present disclosure may support various numbers of connection lines.

Figure 2C:
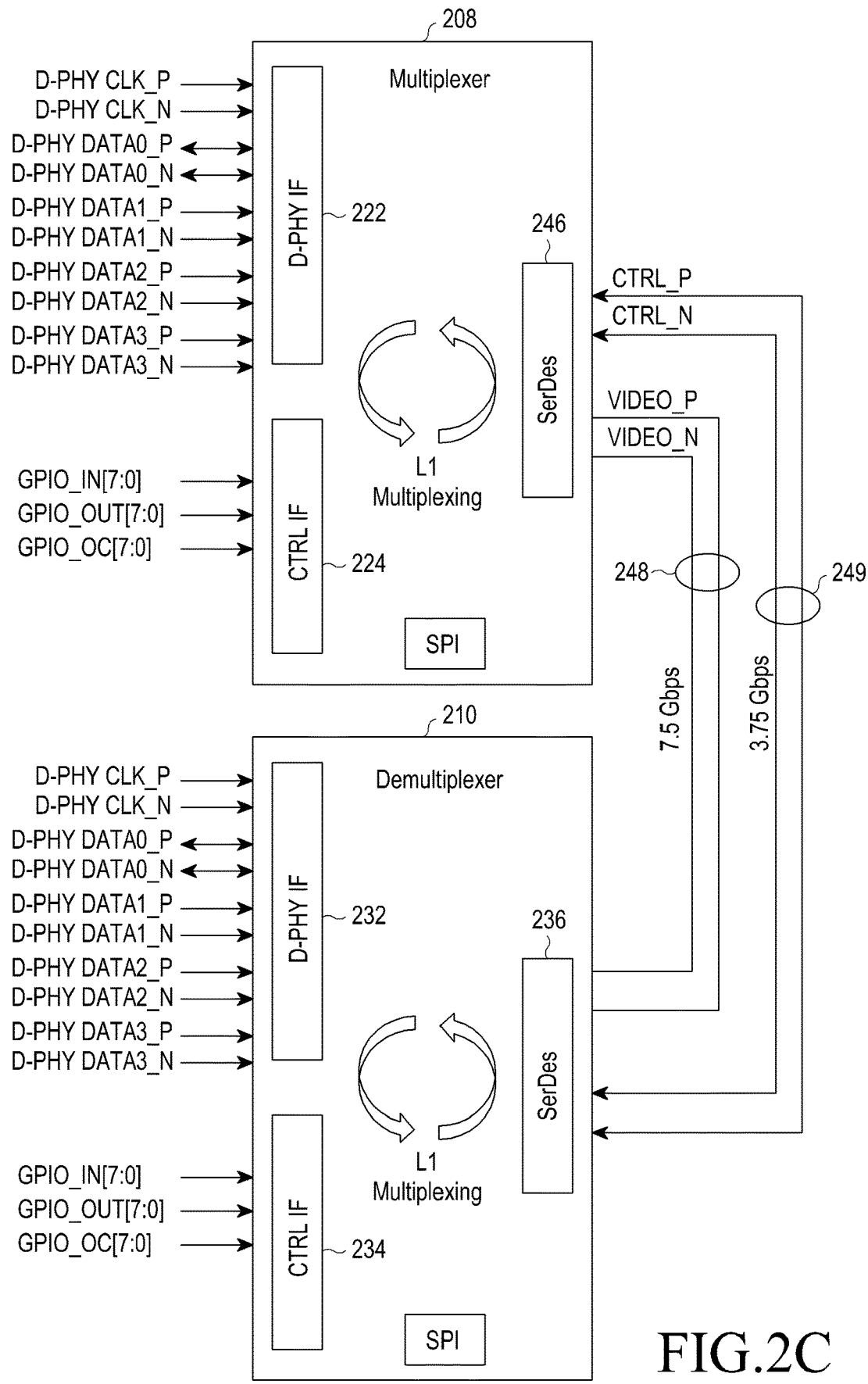
FIG. 2C is a block diagram illustrating an exemplary configuration of a multiplexer and a demuliplexer in a mobile device according to an embodiment of the present disclosure.

FIG. 2C is a block diagram illustrating an exemplary configuration of a multiplexer and a demultiplexer in a mobile device according to an embodiment of the present disclosure. For convenience of description, it is assumed that the multiplexer 208 and the demultiplexer 210 of FIG. 2C correspond to the multiplexer 208 and the demultiplexer 210, respectively, of FIG. 2B.

Referring to FIG. 2C, a D-PHY intermediate frequency (IF) unit 222 is connected to clock signal I/O connection lines and data signal I/O connection lines among the connection lines of the AP 202 in the multiplexer 208. A CTRL IF unit 224 is connected to control signal I/O lines among the connection lines of the AP 202 in the multiplexer 208. Likewise, a D-PHY IF unit 232 is connected to clock signal I/O connection lines and data signal I/O connection lines among the connection lines of the LCD panel 204 in the demultiplexer 210. A CTRL IF unit 234 is connected to control signal I/O lines among the connection lines of the LCD panel 204 in the demultiplexer 210.

According to an embodiment of the present disclosure, the multiplexer 208 and the demultiplexer 210 include serializers/deserializers (SerDes) 246 and 236. Each SerDes 236 or 246 may convert input parallel signals to an output serial signal, and an input serial signal to output parallel signal. Each of the SerDes 246 included in the multiplexer 208 and the SerDes 236 included in the demultiplexer 210 is connected to cables having different transmission rates according to an embodiment of the present disclosure. Specifically, it is assumed in an embodiment of the present disclosure that the cables connected to the SerDes 236 and 246 include cable 248 supporting unidirectional data to the demultiplexer 210 at 7.5 Gbps, which is a relatively high transmission rate, and cable 249 supporting bidirectional control signals at 3.75 Gbps, which is a relatively low transmission rate. Gbps is giga-bits per second.

In the illustrated case of FIG. 2C, there are shown two cables, each with its own different transmission rate. However, the disclosure is not limited to these examples. Rather, various embodiments of the present disclosure can have different transmission rates than those listed and different number of cables. In an embodiment of the present disclosure, if video data is transmitted to the LCD panel, the multiplexer 208 may receive signals from the AP 202 via 10 connection lines, and the demultiplexer 210 may communicate to the LCD panel 204 via 10 connection lines. However, the communication between the SerDes 236 and the SerDes 246 may be via only 4 connection lines, with the cable 248 supporting 7.5 Gbps for video data and the cable 249 supporting 3.75 Gbps for control signals.

An embodiment of the present disclosure provides a method for maintaining functions, while minimizing latency, by integrating interfaces for signals conforming to different protocols using a multiplexer/demultiplexer in a mobile device. For this purpose, the mobile device should be able to tunnel I/O signals of the multiplexer/demultiplexer without breaching a legacy protocol. To support the tunneling, L1 tunneling may be used in an embodiment of the present disclosure, where signals conforming to different protocols are multiplexed only at Layer 1, the physical (PRY) layer. Accordingly, various embodiments of the present disclosure may use L1 tunneling to optimize power consumption and area while minimizing breach of other protocols.

In an embodiment of the present disclosure, signals transmitted and received between an AP and another device in a mobile device may be classified to data signals and control signals, and lanes may be dedicated for these two types of signals with each lane having a different transmission rate. The data signal may correspond to an image signal, a video signal, or the like, and the control signal may correspond to a signal that may be input/output through, for example, a general purpose input/output (GPIO) pins. The GPIO pins may be used to control various devices as appropriate for their functions.

Figure 3A:
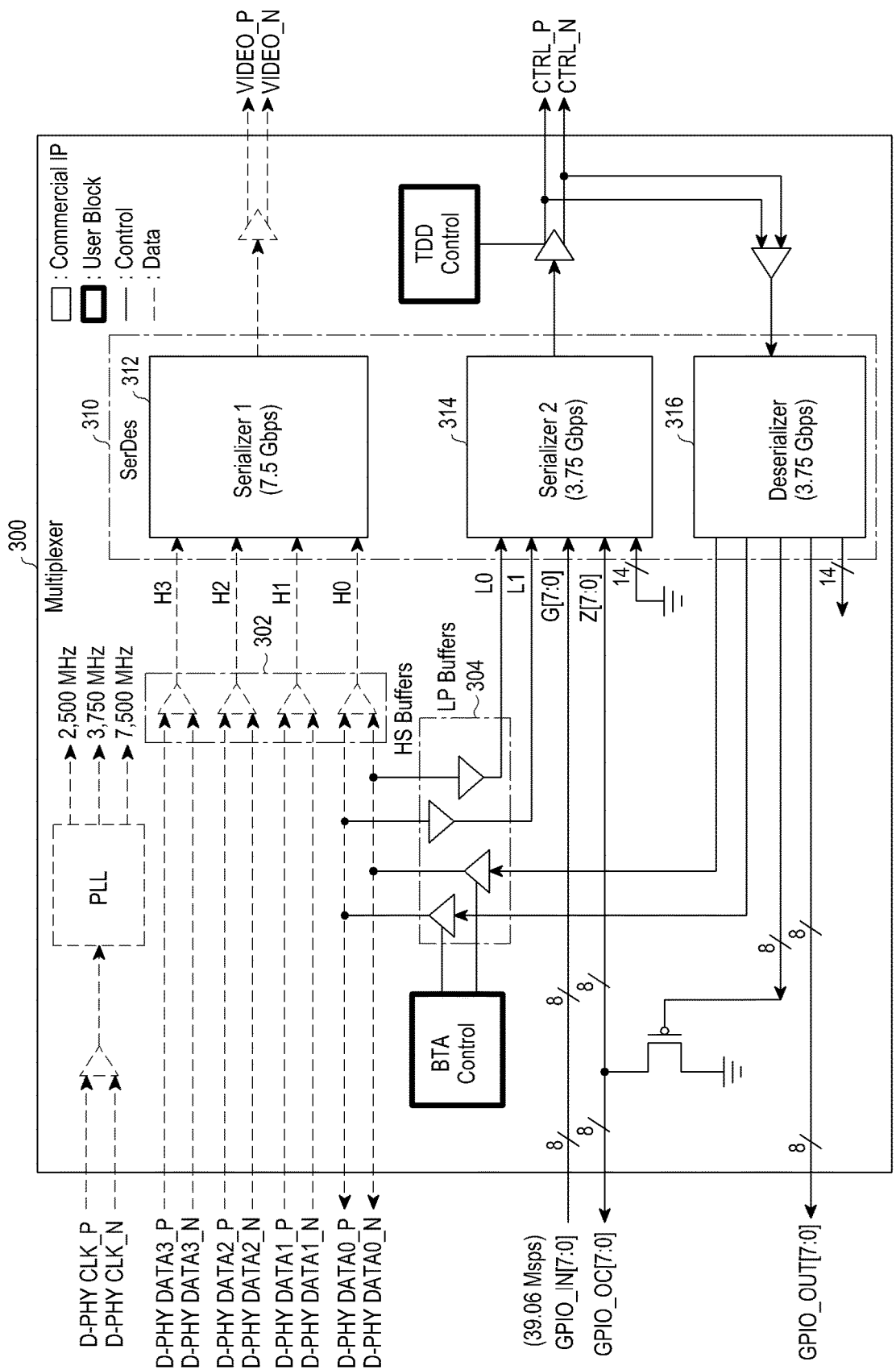
FIG. 3A is a detailed block diagram illustrating an exemplary configuration of a multiplexer in a mobile device according to an embodiment of the present disclosure.
Figure 3B:
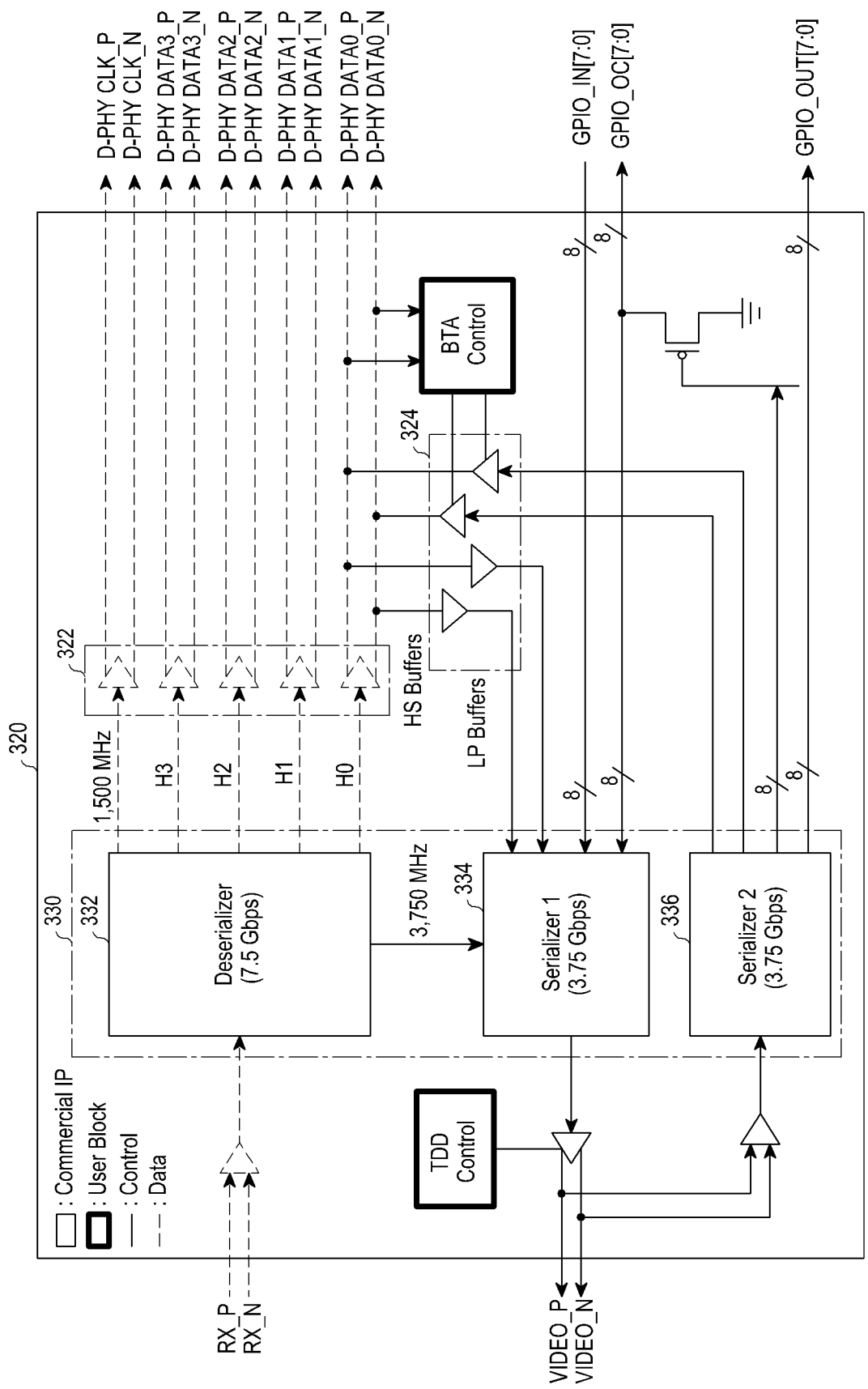
FIG. 3B is a detailed block diagram illustrating an exemplary configuration of a demultiplexer in a mobile device according to an embodiment of the present disclosure.

FIGS. 3A and 3B are detailed block diagrams of a multiplexer and a demultiplexer, respectively, according to an embodiment of the present disclosure. Dotted lines indicate data paths for transmitting data signals that may be, for example, video signals.

Referring to FIG. 3A, the multiplexer 300 includes high speed (HS) buffers 302 for mapping data signals received from an AP to four D-PHYs supported by display serial interface (DSI), and a SerDes 310 for serial to parallel conversion and parallel to serial conversion of I/O signals. According to an embodiment of the present disclosure, the SerDes 310 includes serializer 1 312, serializer 2 314, and deserializer 316. Serializer 1 312 serializes data signals received through the four D-PHYs to one serial signal that is transmitted differentially. In an embodiment of the present disclosure, the serializer 1 312 may be configured to support a minimum transmission rate of 7.5 Gbps for a video signal. The 7.5 Gbps transmission rate may then be able to support 1.875 Gbps transmission rate for video data in each of the four D-PHY for a 1080p resolution display.

Solid lines indicate control paths for control signals in FIGS. 3A and 3B. The multiplexer 300 includes low power (LP) buffers 304 for classifying bidirectional control signals and storing the classified control signals. Serializer 2 314 serializes GPIO signals to a serial signal, which is then transmitted as a differential serial signal. Serializer 2 314 is configured to support, for example, a transmission rate of 3.75 Gbps. The SerDes 310 includes the deserializer 316 that receives a serial control signal to output four sets of control signals where some sets of the control signals may comprise parallel signals. The SerDes 310 may also be configured to support a transmission rate of 3.75 Gbps.

Referring to FIG. 3B, the demultiplexer 320 includes receiving-side devices being the counterparts of transmitting-side devices of the multiplexer 300. The demultiplexer 320 includes a deserializer 332 for separating a serial signal received as one differential pair from the serializer 1 312 of the multiplexer 300 into four data signals and outputting the data signals by mapping the data signals to their respective D-PHYs. The deserializer 332 is configured to support, for example, a transmission rate of 7.5 Gbps. The demultiplexer 320 includes LP buffers 324, serializer 1 334, and a serializer 2 336 respectively corresponding to the LP buffers 304, serializer 2 314, and the deserializer 316 in the multiplexer 300.

The transmission rates of the serializers or the deserializer, 7.5 Gbps and 3.75 Gbps, are purely exemplary. Thus, a SerDes according to an embodiment of the present disclosure may be configured to support various transmission rates. For example, if a transmission rate per lane corresponding to a D-PHY is N, a transmission rate required for the serializer 1 312 may be 4*N.

While the multiplexer 300 and the demultiplexer 320 have been names as such for explanation purposes with respect to data being sent from the multiplexer 300 to the demultiplexer 320, either of the devices may perform both multiplexing and demultiplexing functions. Transmission from the multiplexer 300 to the demultiplexer 320 may be referred to as transmitting downstream, and transmitting from the demultiplexer 320 to the multiplexer 300 may be referred to as transmitting upstream.

Figure 4A:
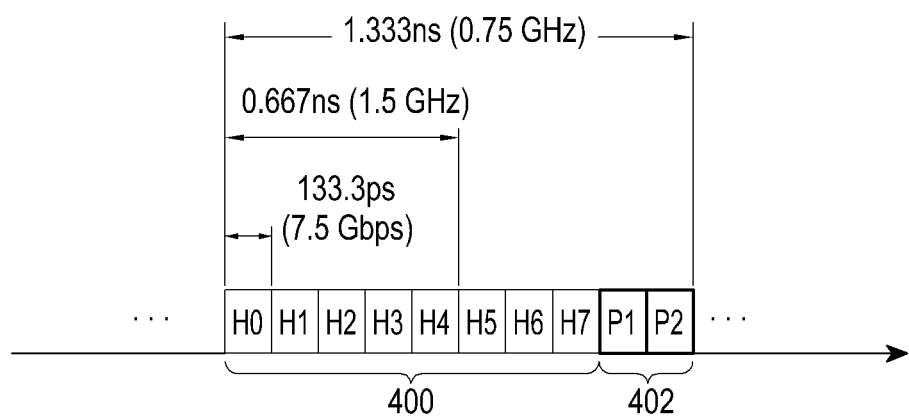
FIGS. 4A and 4B illustrate exemplary configurations of signals transmitted respectively in a data path and a control path, along a time axis according to an embodiment of the present disclosure.
Figure 4B:
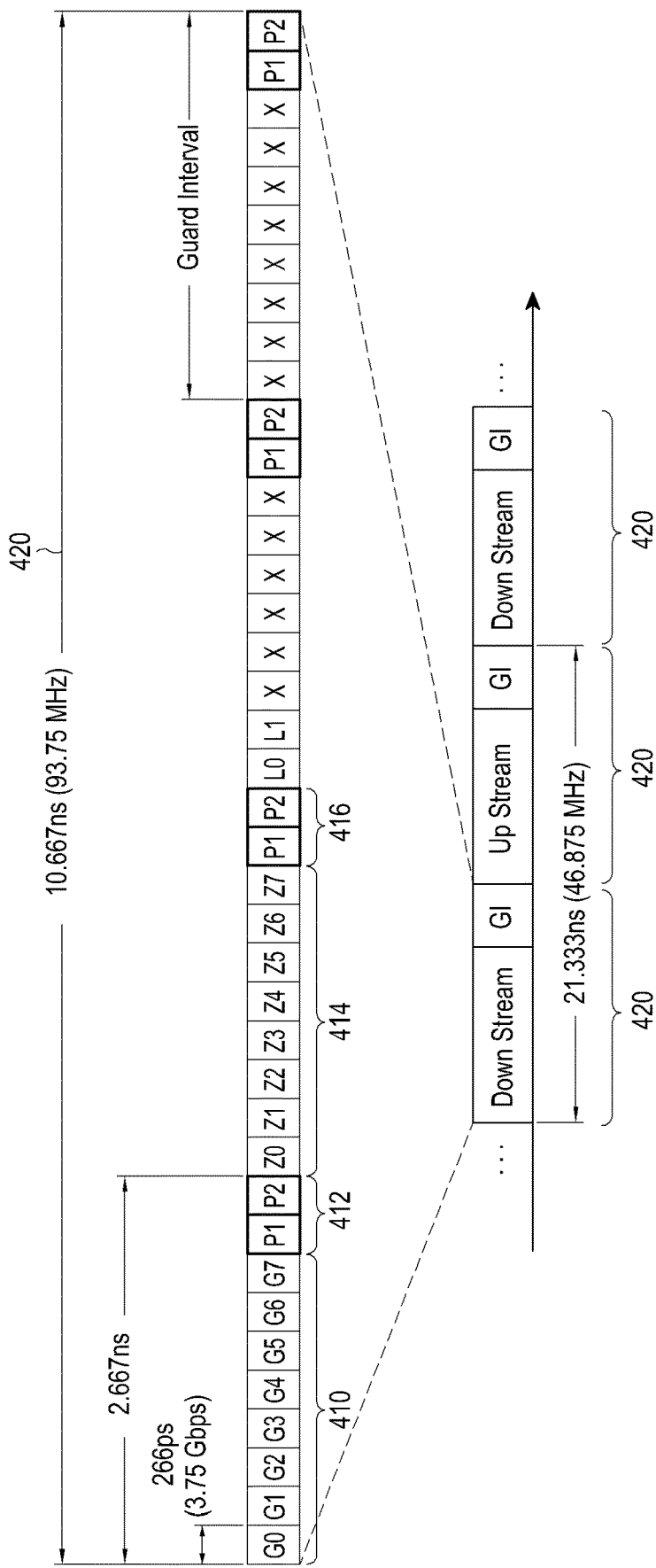

FIGS. 4A and 4B illustrate the configurations of signals transmitted in a data path and a control path, respectively, along the time axis according to an embodiment of the present disclosure. For convenience of description, it is assumed that the signals are transmitted in the data paths and the control paths in each of the multiplexer and the demultiplexer illustrated in FIGS. 3A and 3B.

Referring to FIG. 4A, a data path may support a higher transmission rate, for example, 7.5 Gbps, than a control path, and may support unidirectional communication. The data signals H0 to H7, which may be input in parallel through the various D-PHYs, may be converted to a serial data signal 400. To distinguish the serial data signal 400 from subsequent serial data signals, a packet identification signal 402, that is, P1 and P2, are inserted in the serial data signal.

Referring to FIG. 4B, the control path may support a lower transmission rate (e.g 3.75 Gbps) relative to the data path (e.g. 7.5 Gbps), and may support bidirectional communication. The bidirectional communication may be time division duplexed to alternate transmission in equal time periods in the downstream direction and the upstream direction.

Accordingly, control signals received in parallel, for example, the control signals G0-G7 410, Z0-G7 414, may be converted to a serial format and transmitted downstream by the multiplexer 300 as part of a serial control signal interval 420. Similarly, the control signals received in parallel, for example, the control signals G0-G7 410, Z0-G7 414, may be converted to a serial format and transmitted upstream by the demultiplexer 320 as part of a subsequent serial control signal interval 420.

Packet identification signals 412 may be inserted after bits corresponding to the control signals G0-G7 410. Accordingly, there may be packet identification signals 412 after the control signals G0-G7 410, and packet identification signals 416 after the control signals Z0-G7 414. Various embodiments of the invention may use different guard intervals as appropriate.

As described above, because control signals transmitted and received in a control path are bidirectional signals in a mobile device, a structure for minimizing latency during switching between transmission and reception in the control path is required.

Figure 5:
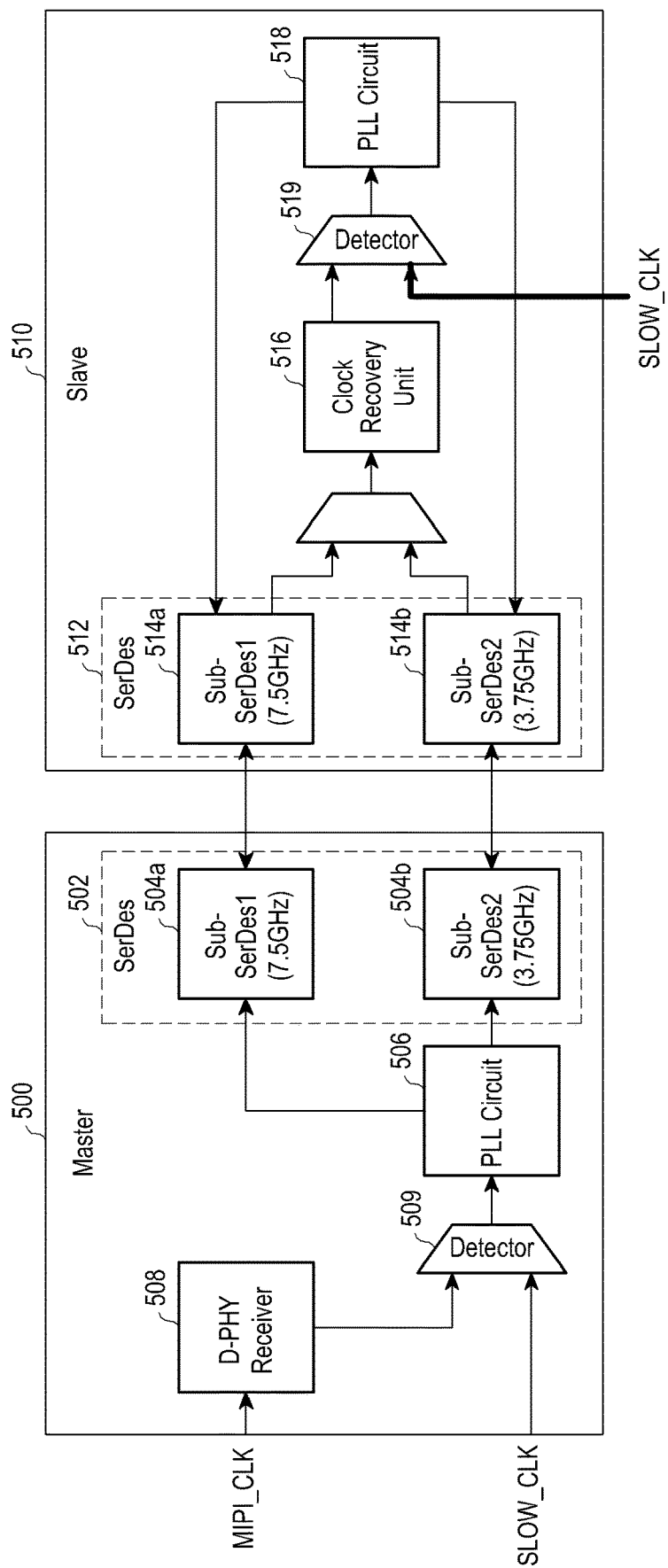
FIG. 5 is a block diagram illustrating an exemplary configuration of a mobile device for minimizing latency during switching between transmission and reception in a control path according to an embodiment of the present disclosure.

FIG. 5 is a block diagram illustrating an exemplary configuration of a mobile device for minimizing latency during switching between transmission and reception in a control path according to an embodiment of the present disclosure.

Referring to FIG. 5, a mobile device according to an embodiment of the present disclosure is provided with a detector 509 at a front end of a lane supporting bidirectional communication (hereinafter, referred to as a "bidirectional lane"), for pre-sensing whether bidirectional communication has started in the bidirectional lane. The detector 509 may control the power state of the mobile device in four cases for the detection result. A master and a slave may correspond, for example, to the afore-described multiplexer 300 and demultiplexer 320, respectively. The master 500 includes a D-PHY receiver 508 for receiving the high-speed clock signal, MIPI clock, that may be used by the SerDes 502. The MIPI clock may be from an AP of a mobile device that includes the master 500. The MIPI clock and a slow clock may be provided to the detector 509, and the detector 509 may select one of the MIPI clock and the slow clock as a source clock to a phase-locked loop (PLL) 506 by the detector 509. The output of the PLL 506 may be referred to as the main clock that may be input to the SerDes 502. According to an embodiment of the present disclosure, the detector 509 may operate the mobile device in a total of four power states by controlling the main clock, the source clock, and controlling on/off states of the PLL 506. The detector 509 may select one of the inputs MIPI clock and slow clock as the source clock for the PLL 506.

TABLE 1

|  | PLL | source clock | main clock |
| --- | --- | --- | --- |
| standby | off | slow clock | slow clock |
| sub-tunneling | on | slow clock | PLL-out |
| normal | on | MIPI clock | PLL-out |
| ULP | off | slow clock | slow clock |

Referring to [Table 1], the power state of the mobile device according to an embodiment of the present disclosure may be one of a standby state, a sub-tunneling state, a normal state, and an ultra-low power (ULP) state according to a detection result of the detector 509. The normal state refers to a state here the mobile device has maximum power consumption. In the normal state, the PLL 506 is turned on, and the MIPI clock is input as the source clock for the PLL 506 and the output of the PLL 506 may be the main clock to the SerDes 502. The PLL 506 may generate an output that is five tunes faster than the source clock, where the factor five may depend on various design and implementation parameters.

The sub-tunneling state refers to a state in which only the sub-SerDes 504b having a relatively low rate is operated. In the sub-tunneling state, the PLL 506 is turned on, a slow clock is input as the source clock to the PLL 506, and the output from the PLL 506 is connected as the main clock to the SerDes 502. In the ULP state and the standby state, the PLL 506 is turned off and a slow clock is input as the source clock. Accordingly, the output of the PLL 506 may be the source clock. Therefore, in the ULP and standby states minimum power is consumed by the SerDes 502. Here, the ULP state of the mobile device represents off state of remaining operations except for a basic operation, and the standby state represents a low power state of the mobile device.

According to an embodiment of the present disclosure, the detector 509 may adjust the power state of the mobile device periodically or according to a real-time detection result of a bidirectional lane. For example, if all lanes operate at the maximum rate, the mobile device is operating in a normal state. If only a CTRL IF unit 224 or 234 (FIG. 2C) operates without transmission of a high-rate video signal in the mobile device, the power consumption of the mobile device may be minimized by operating the mobile device in the ULP state. The power state control of the mobile device may be performed dynamically according to use or non-use of each IF unit and each lane.

Another embodiment of the present disclosure may be used for devices that use inter-integrated circuit (I2C) protocol in a structure for minimizing the number of connection lines in a mobile device, and a configuration of the mobile device using the same.

Figure 6A:
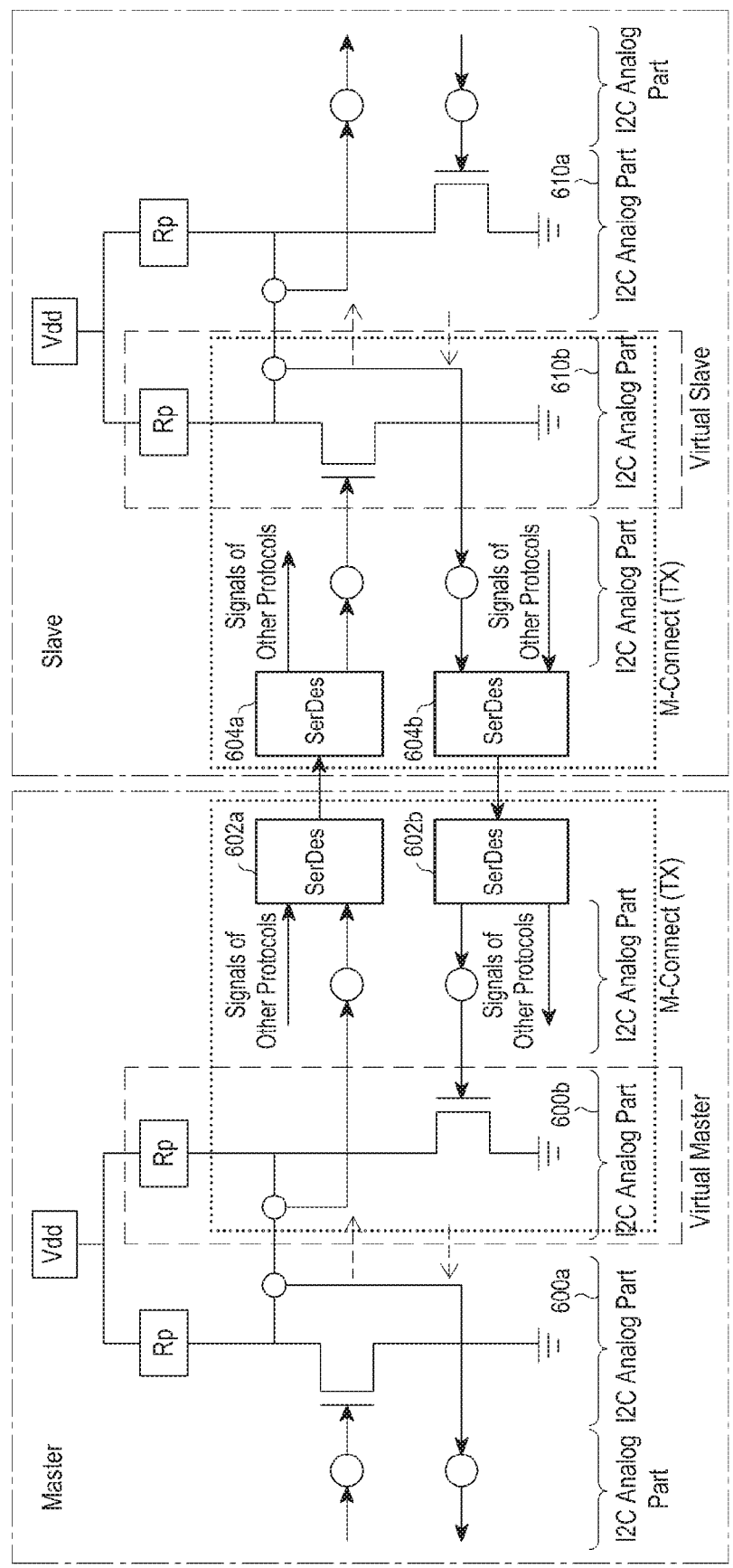
FIG. 6A is a block diagram illustrating an exemplary configuration of a mobile device for processing an inter-integrated circuit (I2C) signal according to an embodiment of the present disclosure.

The I2C protocol is used mainly for a system setting supporting a low transmission rate such as, for example, a data rate of about 100 Kbps, 400 Kbps, 1 Mbps, or 3.4 Mbps, where Kbps is kilo-bits per second and Mbps is mega-bits per second. I2C devices may be concatenated serially and two wires may be shared for data transmission and reception between a device operating as a master and a device operating as a slave. Since the I2C protocol supports a bidirectional bus, an I2C signal may be distorted due to a response delay from a slave or a change in electrical characteristics during communication between a plurality of masters and a plurality of slaves. Further, if a transceiver or bridge functioning as a relay is inserted in an I2C signal path, a response delay from a slave is further prolonged in view of a round trip latency caused by the relay. In FIG. 6A, a virtual master and virtual slave for minimizing delay illustrated.

As illustrated in FIG. 6A, therefore, a virtual master 600b and a virtual slave 610b are inserted symmetrically to parts 600a and 610a for analog processing of IC2 signals from a master and a slave in an embodiment of the present disclosure. The virtual master 600b and the virtual slave 610b may have an open drain structure or an open collector structure. A signal input to a master is provided to a SerDes 602a through the virtual master 600b and serialized together with signals of other protocols. Similarly, a signal input to a slave is provided to a SerDes 604b through the virtual slave 610b and serialized together with signals of other protocols. As an input signal of each of the master and the slave is serialized together with signals of other protocols as described above, latency may be minimized compared to a case in which all signals are identified and then output.

Another embodiment of the present disclosure provides a method for processing a SLIMbus signal in a structure for minimizing the number of connection lines in a mobile device, and a configuration of the mobile device for performing the method.

A SLIMbus interface was proposed to overcome shortcomings of legacy inter-chip interfaces, serial peripheral interface (SPI), synchronous serial interface (SSI), I2C, and integrated inter-chip sound (I2S). The legacy inter-chip interfaces have more wires for more slaves and support peer-to-peer (P2P) communication. In contrast, the SLiMbus interface may support multiple slaves and multiple masters using two wires. This SLIMbus interface has a total of four layers—Device layer, Protocol layer, Frame layer, and Physical layer.

In an embodiment of the present disclosure, the SLIMbus interface enables SLIMbus tunneling, maintaining the functionality of the physical layer. The physical layer of the SLIMbus interface is divided into a physical medium independent (PMI) part and a physical medium dependent (PMD) part. The SLIMbus interface includes two wires for transmitting and receiving a CLK signal and a DATA signal, respectively, and conforms to an asynchronous, multi-drop bus standard. Each wire may operate in a single-ended mode supporting unidirectional communication, a ground referenced mode, and a voltage mode. Herein, ground referenced means that a signal changes based on a voltage ground, that is, '0V', and the voltage mode means that a signal is transmitted by a voltage difference. A DATA signal is output or driven at a rising edge corresponding to the wire of a CLK signal and captured at a falling edge, as illustrated in FIG. 6B.

Figure 6B:
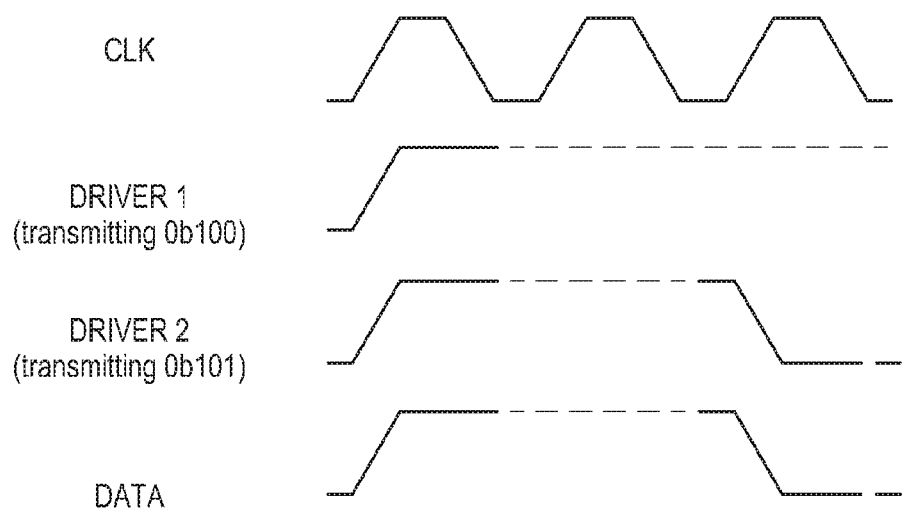
FIG. 6B is a timing diagram illustrating exemplary signal states in the SLIMbus interface.

FIG. 6B illustrates exemplary signal states in the SLIMbus interface.

Referring to FIG. 6B, the first waveform is the waveform of the CLK signal and the last waveform is the waveform of the DATA signal. The second waveform is the waveform of a signal '0b100' transmitted through driver 1, and the third waveform is the waveform of a signal '0b101' transmitted through driver 2.

The DATA signal may be placed in one of three states, high, low, and hold, in the SLIMbus interface. The CLK signal may be generated in a device operating as a framer and the other devices are used for input of the DATA signal. The CLK signal is unencoded and the DATA signal is non-return-to-zero-inverted (NRZI)-encoded. If a previous data signal is different (hereinafter, referred to as "transitioned") from a current data signal, a High state is placed in NRZI, and if the previous data signal is identical to the current data signal, a Low state is placed in NRZI. The DATA signal uses logic-OR signaling. Herein, each component drives the DATA signal to the High and Low states during a High interval of the CLK signal. If the DATA signal is in the Low state, the DATA signal is held even though the CLK signal is in a High period according to NRZI. During a Low period of the CLK signal, the previous state of the DATA signal is held.

According to this characteristic, a logical-OR operation is performed when multiple components are multi-driven. The afore-described NRZI and logic-OR signaling prevent multi-driving. NRZI is characterized by inversion of a previous value when a DATA signal is in the High state. In view of this NRZI characteristic, when different components drive the DATA signal to the High state, the DATA signal is driven to the same state (High or Low) and thus collision does not occur. In addition, when the DATA signal is driven to the Low state, the driving is not needed due to logic-OR signaling, thus preventing collision between components. Now, an embodiment of the present disclosure provides a tunneling method for enabling signal transmission, while maintaining the functionality of a physical layer in SLIMbus.

Figure 7A:
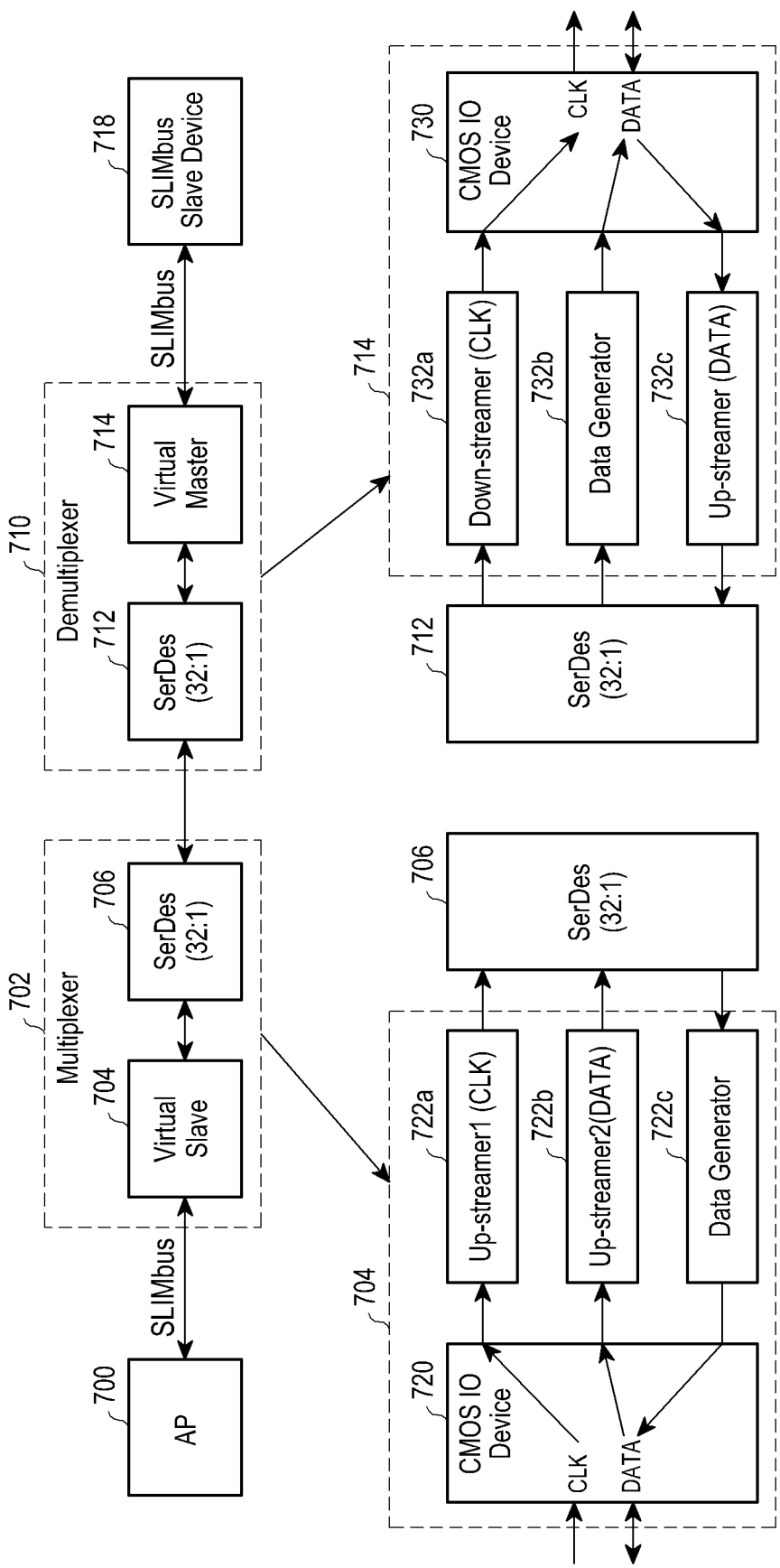
FIG. 7A is a block diagram illustrating an exemplary configuration of a mobile device for processing a serial low-power inter-chip media bus (SLIMbus) signal according to an embodiment of the present disclosure.

FIG. 7A is a block diagram illustrating an exemplary configuration of a mobile device for processing a SLIMbus signal according to an embodiment of the present disclosure.

Referring to FIG. 7A, for SLIMbus tunneling, a multiplexer 702 and a demultiplexer 710 are configured to include a virtual slave 704 and a virtual master 714, respectively, in a mobile device according to an embodiment of the present disclosure. The multiplexer 702 and the demultiplexer 710 include SerDes 706 and 712, respectively, for conversion of data input/output from/to the virtual slave 704 and the virtual master 714. In an embodiment, each of the SerDes 706 and 712 may convert 32 parallel signals to a single serial signal and may convert a single serial signal to 32 parallel signals. However, various embodiments of the present disclosure may have different number of parallel data conversion by a SerDes in order to process a SLIMbus signal or other types of signals in a mobile device.

With respect to FIG. 7A, signals to a SerDes, whether to SerDes 706 or to SerDes 712, will be said to go upstream. Similarly, signals from a SerDes, whether from SerDes 706 or from SerDes 712, will be said to go downstream.

The virtual slave 704 corresponds to a virtual device component for the SLIMbus interface. The virtual slave 704 may receive a CLK signal and a DATA signal from an AP 700 through two wires, and a wire for a bidirectional DATA signal from/to the AP 700. The virtual master 714 corresponds to a virtual framer/manager for the SLIMbus interface. The virtual master 714 also has a wire for outputting a CLK signal to the slave device 718 and a wire for a bidirectional DATA signal from/to the slave device 718.

According to an embodiment of the present disclosure, the virtual slave 704 includes a complementary metal-oxide semiconductor (CMOS) input/output (IO) device 720, up-streamers 722a and 722b, and a data generator 722c, for SLIMbus tunneling. The CMOS IO device 720 includes an input unit for the CLK signal and an input/output unit for the DATA signal for interfacing with the AP 700. The CMOS IO device 720 outputs the CLK signal to the up-streamer 1 722a, outputs data signal to up-streamer 2 722b, and receives data signal from the data generator 722c. The CMOS IO device 720 controls pull-up/pull-down resistors to clarify the Low and High states of an input signal. The up-streamer 1 722a sends a clock signal to the SerDes 706. The up-streamer 2 722b samples the DATA signal at a high frequency using the CLK signal and provides the sampled DATA signal to the SerDes 706. The data generator 722c received data from the SerDes 706.

Upon receipt of an input signal from the SerDes 706, the data generator 722c monitors transition of the input DATA signal according to the characteristics of the physical layer in the SLIMbus interface. Upon detection of transition, the data generator 722c outputs an appropriate value in a High period of the CLK signal. This is explained in more detail with respect to FIGS. 7B and 7C.

Similarly, the virtual master 714 includes a CMOS IO device 730, a down-streamer 732a, a data generator 732b, and an up-streamer 732c, in correspondence with the virtual slave 704. Since the virtual master 714 acts as a framer, the CMOS IO device 730 adjusts a slew rate generated for a signal output from the SerDes 712. The down-streamer 732a acquires a clock signal from the SerDes 712 and outputs the clock signal to the CMOS IO device 730. The data generator 732b acquires a data signal from the SerDes 712. Upon detection of transition of the data signal, the data generator 732b outputs the data signal during a High period of the clock signal to the CMOS IO device 730. The data generator 732b uses the clock signal received from the SerDes 712 as a SLIMbus CLK signal. The up-streamer 732c samples the data signal received from the CMOS IO device 730 at a high frequency and provides the sampled data signal to the SerDes 712.

The CMOS IO device 730 receives the clock signal from the down-streamer 732a and outputs it to the slave device 718 via the CLK wire. The CMOS IO device 730 also receives the data signal from the data generator 732b and outputs it to the slave device 718 via the bidirectional DATA wire. The CMOS IO device 730 receives data from the slave device 718 via the bidirectional DATA wire and outputs it to the up-streamer 732c.

Figure 7B:
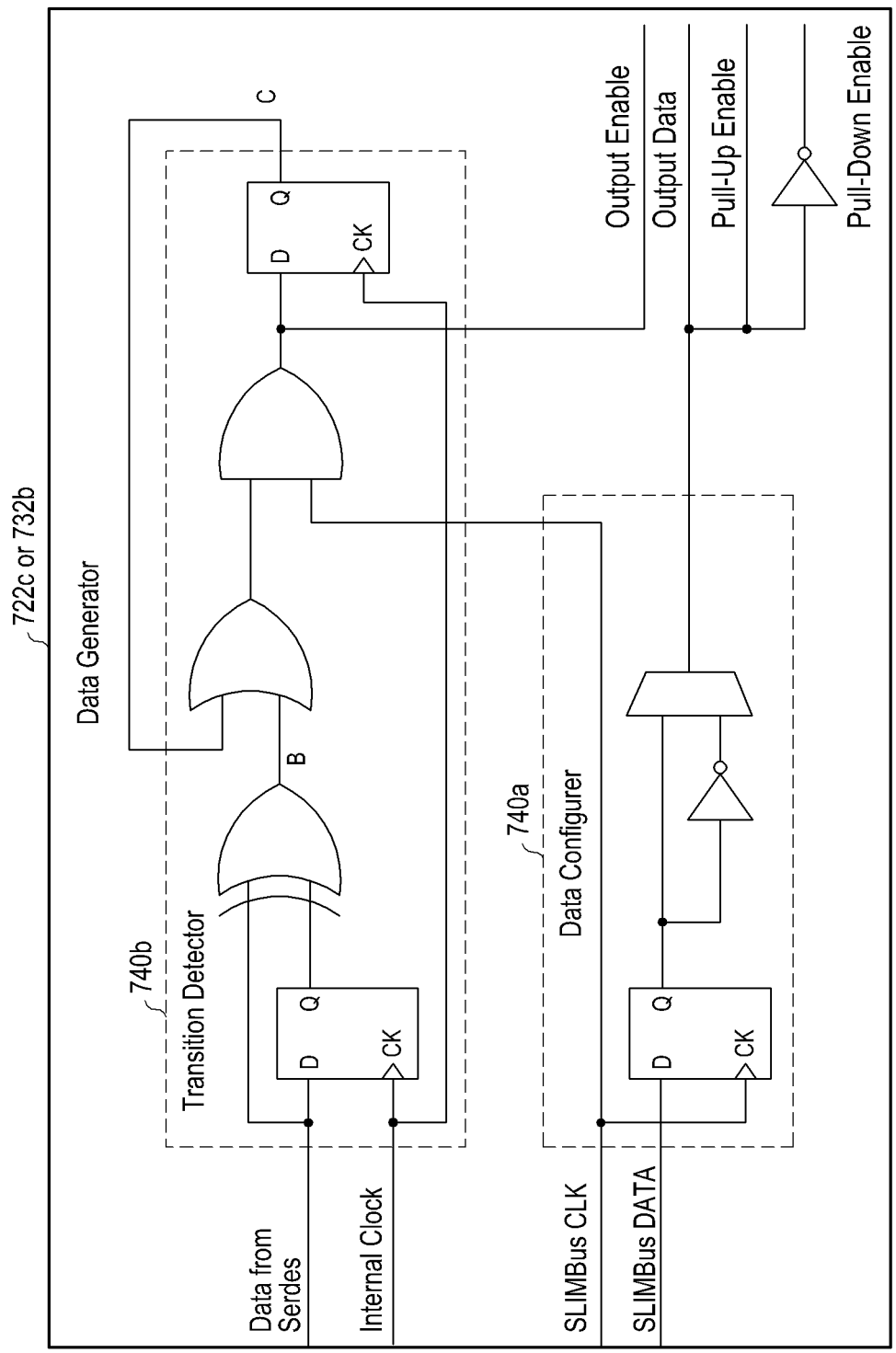
FIG. 7B is a block diagram of a data generator included in a virtual slave or a virtual master according to an embodiment of the present disclosure.

FIG. 7B is a block diagram illustrating an exemplary data generator included in a virtual slave or a virtual master according to an embodiment of the present disclosure. For the convenience of description, it is assumed that the data generator is the data generator 722c or 732b illustrated in FIG. 7A.

Referring to FIG. 7B, the data generator according to an embodiment of the present disclosure monitors transition of an input data signal. Upon detection of transition of the data signal, the data generator drives the data signal in a High period of a CLK signal.

Specifically, the data generator 722c or 732b largely includes a data configurer 740a and a transition detector 740b. The transition detector 740b generates an output enable signal, and the data configurer 740a outputs an inverted signal of a previous SLIMbus DATA signal.

Figure 7C:
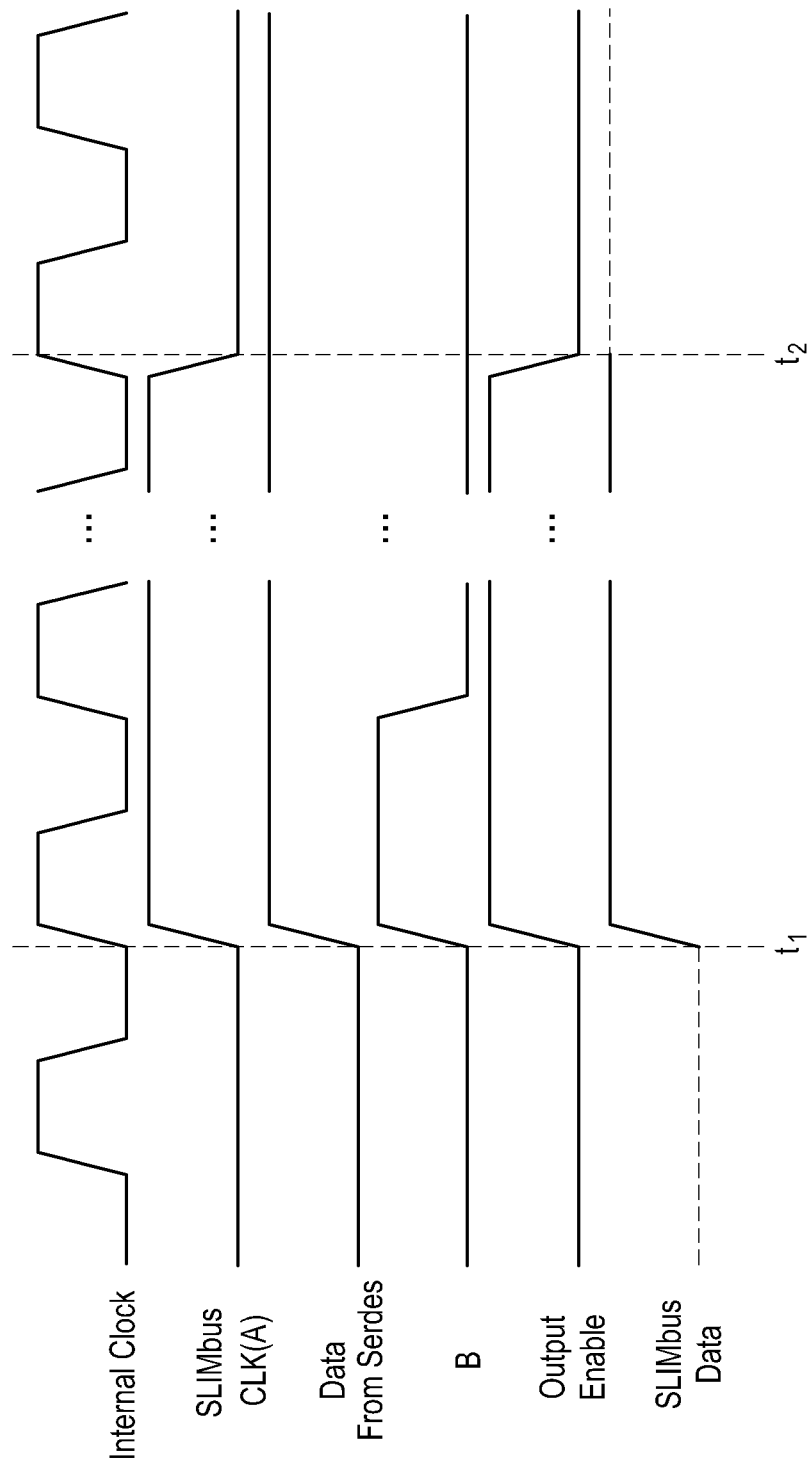
FIG. 7C illustrates exemplary waveforms of signals processed in a data generator according to an embodiment of the present disclosure.

FIG. 7C illustrates exemplary waveforms of signals processed in a data generator according to an embodiment of the present disclosure.

Referring to FIG. 7C, the transition detector 740 detects transition of a data signal received from a SerDes. Then, the data configurer 740a maintains the SLiMbus data signal in a High state during a High period of a SLIMbus CLK signal at time t1. If the transition detector 740 has not detected transition of the data signal received from the SerDes, the data configurer 740a floats the SLIMbus DATA signal where the pull-up/pull-down resistors may bias it to a HIGH level at time t2. Described below are other embodiments of the present disclosure for minimizing the number of signal transmission lines used in a mobile device by using differential signaling and common transmission mode signaling.

Differential signaling may be used for high-rate signal transmission at or above, for example, hundreds of Mbps in a mobile device according to an embodiment of the present disclosure. Although differential signaling is performed using two lines, interference may be minimized during signal transmission due to use of for example, current sensors with low signal amplitude.

Figure 8A:
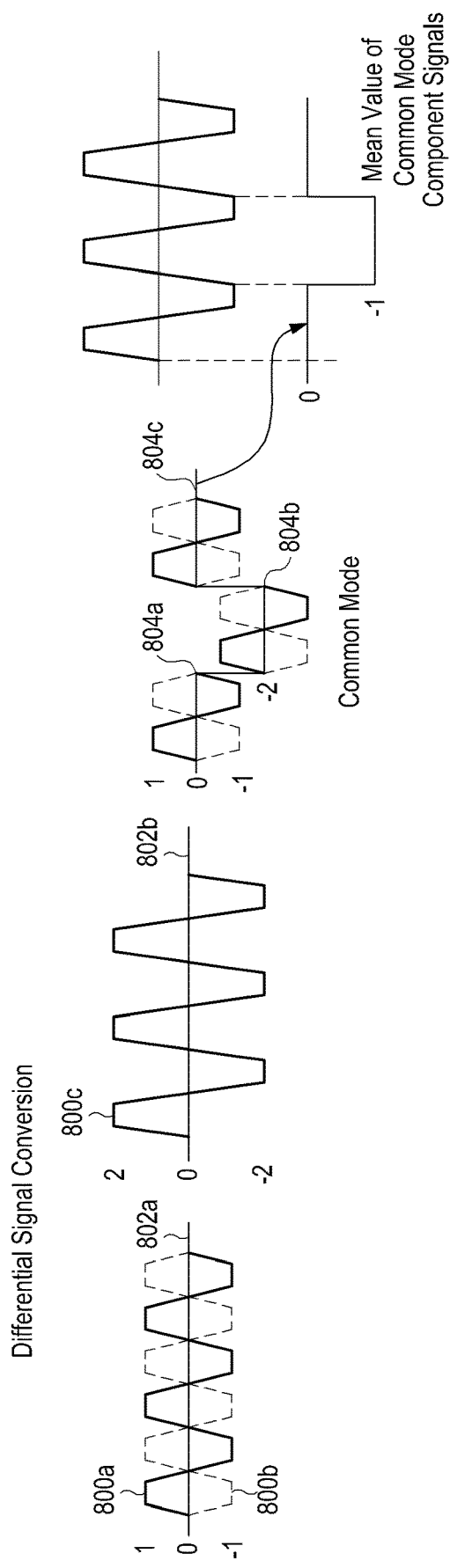
FIG. 8A illustrates exemplary signals to which differential signaling and common transmission mode signaling are applied, respectively according to an embodiment of the present disclosure.

FIG. 8A illustrates exemplary signals to which differential signaling and common transmission mode signaling are applied, respectively, according to an embodiment of the present disclosure.

Referring to FIG. 8A, for differential signaling, the difference between the amplitudes of two signals having a phase difference of 180 degrees may be calculated and a differential signal having an amplitude twice as large as the amplitudes of each of the signals may be generated. Specifically, a differential signal 800c having an amplitude of 2 may be output by subtracting the amplitude of a dotted-line signal 800b having an amplitude of −1 and a phase difference of 180 degrees with respect to a solid-line signal 800a having an amplitude of 1 from the amplitude of the solid-line signal 800a. For a general differential signal, common mode components 802a and 802b corresponding to the reference of a waveform are fixed to a direct current (DC) level. On the other hand, a common mode component signal of the differential signal may be able to be used for transmission of a bidirectional signal and, an average signal of common mode components 804a and 804b is represented as 804c.

Figure 8B:
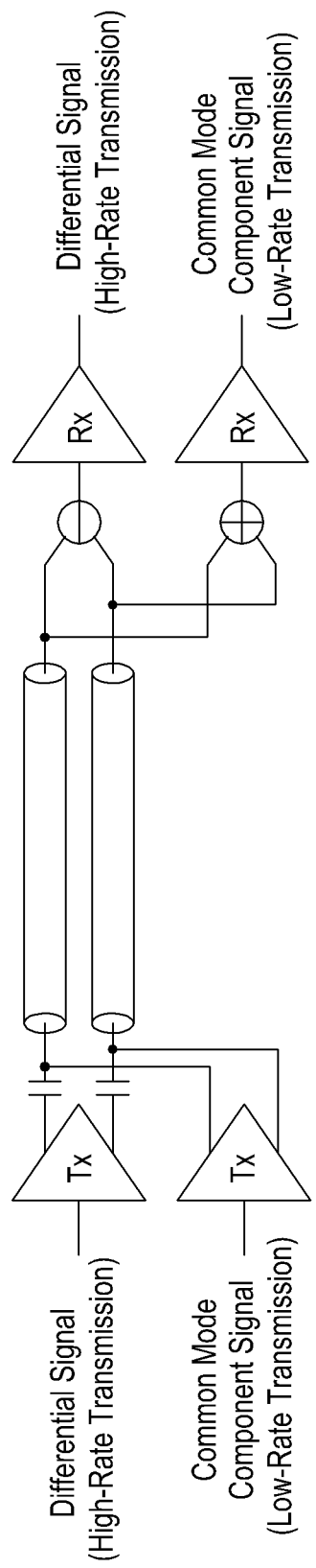
FIG. 8B illustrates an exemplary configuration of a mobile device to which differential signaling and common transmission mode signaling are applied, respectively according to an embodiment of the present disclosure.

FIG. 8B is a block diagram illustrating an exemplary configuration of a mobile device to which differential signaling and common transmission mode signaling are applied. If legacy differential signaling is used, the configuration of FIG. 8B may increase a data rate without increasing the number of transmission lines required for the mobile device.

Because a common mode component signal supports unidirectional communication, if some data is loaded in the common mode component signal, the common mode component signal has a lower transmission rate than a differential signal. Therefore, a transceiver may be configured to transmit a control signal by a common mode component signal and a data signal by a differential signal as illustrated in FIG. 8B according to an embodiment of the present disclosure. The transceiver may substitute for a multiplexer and a demultiplexer in a mobile device according to an embodiment of the present disclosure.

Since the differential signal and the common mode component signal are electrically separate, they may be used in different directions. That is, if a data signal transmitted in the form of a differential signal is set to a transmission direction, the transmission direction of a control signal transmitted in a common mode component signal may be set to a reverse direction of the data signal. Accordingly, a transmission line for a differential signal may be configured to support unidirectional communication and, at the same time, a transmission line for a common mode component signal may be configured to support bidirectional communication in an embodiment of the present disclosure, as illustrated in FIG. 8B.

In this case, while not shown, an input signal decider may be further included in order to determine the rate of an input signal and to assign the input signal for a differential signal or for a common mode component signal according to the determined rate. Specifically, if the input signal is a data signal, the input signal decider may assign the data signal to the transmission line for a different signal because the data signal is a high-rate signal. If the input signal is a control signal, the input signal decider may assign the control signal to the transmission line for a common mode component signal because the control signal is a low-rate signal. The same differential transmission lines are being used for the differential signals and common mode signals.

In general, a mobile device uses a separate power line to transmit DC power. As more devices are mounted in the mobile device, the resulting addition of power lines also increases overhead.

Figure 8C:
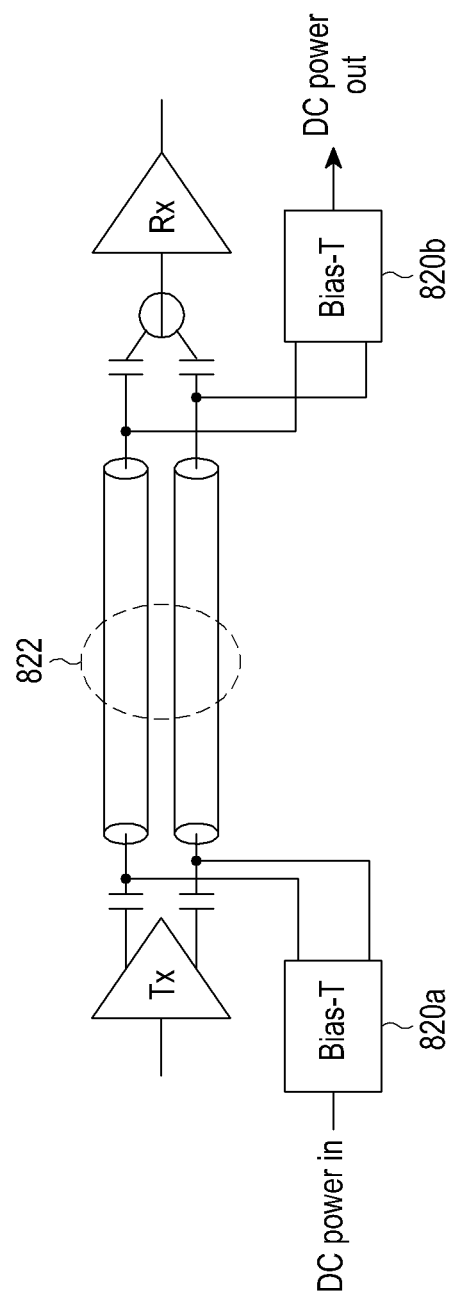
FIG. 8C illustrates an example in which common transmission mode signaling is applied to direct current (DC) power transmission according to an embodiment of the present disclosure.

In another embodiment of the present disclosure, common transmission mode signaling is applicable to DC power transmission. FIG. 8C illustrates an example in which common transmission mode signaling is applied to DC power transmission according to an embodiment of the present disclosure.

Referring to FIG. 8C, bias-T blocks 820a and 820b are added for transmission of a common mode component signal. Therefore, DC power as well as a high-rate data signal may be transmitted in a differential signal transmission line 822. The bias-T blocks 820a and 820b are circuits that pass only DC components without passing Alternating Current (AC). DC power and a control signal in the form of an AC signal may be separated from each other in the frequency domain based on the property of the circuits. Meanwhile, a method for using a common mode component signal for TDD bidirectional communication is considered in another embodiment of the present disclosure. In TDD bidirectional communication, turn-around handshaking is needed to avoid simultaneous channel driving between a transmitting end and a receiving end. With the turn-around handshaking, it is possible to perform communication switching by transmitting switching signal indicating switching from transmission to reception or from reception to transmission on a separate channel, or using a specific protocol. Another embodiment of the present disclosure provides two methods for TDD bidirectional communication using a common mode component signal.

Figure 9:
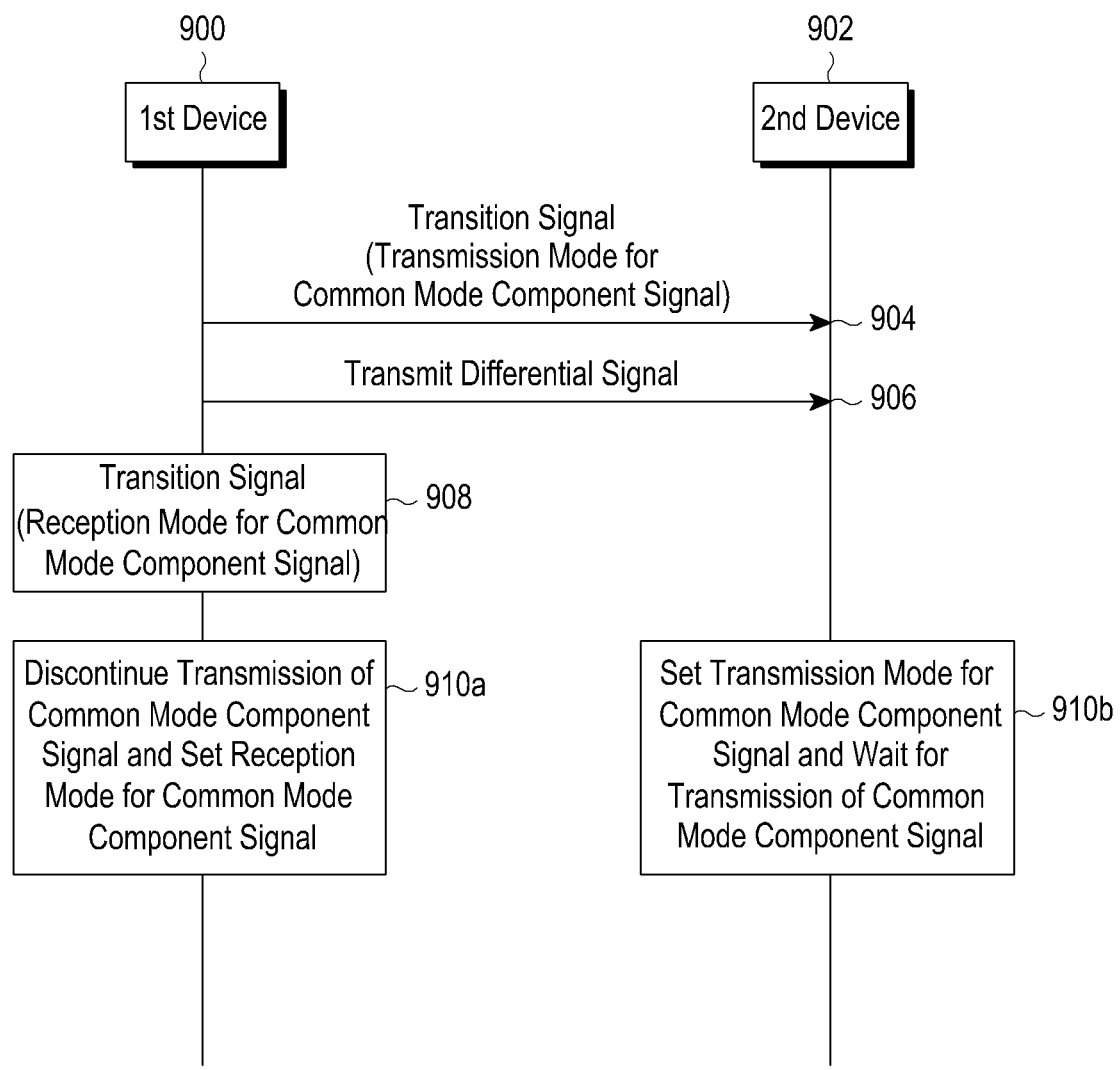
FIG. 9 is a flowchart illustrating an operation for performing communication switching by transmitting a switching signal on a separate channel during time division duplex (TDD) bidirectional communication of a common mode component signal according to another embodiment of the present disclosure.

FIG. 9 is a flowchart illustrating an exemplary case in which communication switching is performed by transmitting a switching signal on a separate channel in TDD bidirectional communication using a common mode component signal according to another embodiment of the present disclosure.

Referring to FIG. 9, for convenience of description, devices located at both ends of a transmission line for a differential signal and a transmission line for a common mode component signal are referred to as a first device 900 and a second device 902. Communication is not being conducted yet between the first device 900 and the second device 902. If the first device 900 determines to perform forward communication for a common mode component signal, the first device 900 sets a transmission mode for the common mode component signal. Then, the first device 900 transmits a switching signal indicating the transmission mode for the common mode component signal to the second device 902 in operation 904. The switching signal may be transmitted on a channel established for transmission of a separate switching signal between the first device 900 and the second device 902. It is assumed herein that information indicating whether the switching signal indicates the transmission mode or reception mode for the common mode component signal is preset between the first device 900 and the second device 902.

Upon receipt of the switching signal, the second device 902 is set to the reception mode for the common mode component signal. In operation 906, the first device 900 transmits a differential signal to the second device 902 in the differential signal transmission line. It is assumed that the first device 900 determines to perform reverse communication for the common mode component signal by starting turn-around handshaking in operation 908. Then, the first device 900 transmits a switching signal indicating the reception mode for the common mode component signal to the second device 902. Thus, the first device 900 ends transmission of the common mode component signal and sets the reception mode for the common mode component signal in operation 910a.

Similarly, the second device 902 may set the transmission mode for the common mode component signal and then waits for data transmission in operation 910b. Meanwhile, switching may be performed between transmission and reception of a common mode component signal using a specific protocol in the second method according to an embodiment of the present disclosure. For example, 8b/10b encoding widely used for a video signal may have specific bit patterns that are unused. Such a specific bit pattern may be used as a switching signal between transmission and reception of a common mode component signal. In this case, switching between transmission and reception of the common mode component signal may be indicated by transmitting the specific bit pattern instead of a switching signal in operations 904 to 908 of FIG. 9. It is assumed that the specific bit pattern is preset between the first device 900 and the second device 902.

Figure 10:
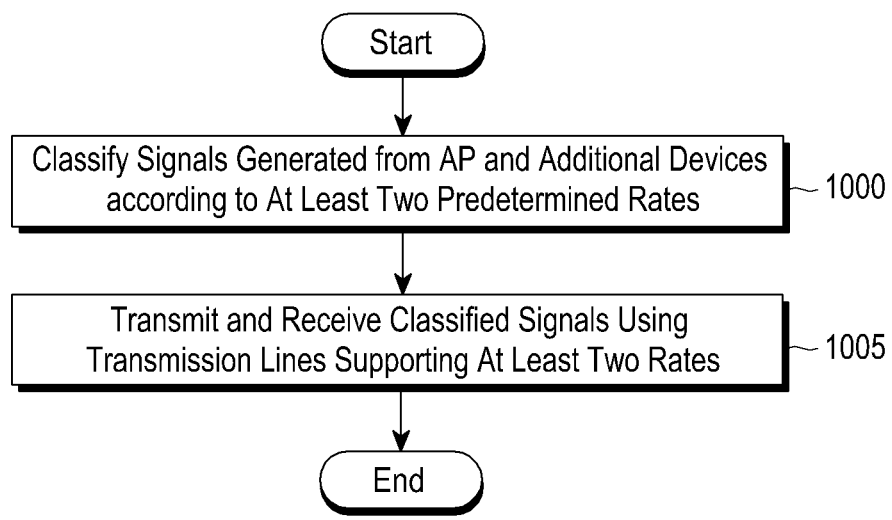
FIG. 10 is a flowchart illustrating an exemplary operation for processing a signal in a mobile device according to an embodiment of the present disclosure.

FIG. 10 is a flowchart illustrating an exemplary operation for processing a signal in a mobile device according to an embodiment of the present disclosure.

Referring to FIG. 10, the mobile device classifies signals generated from an AP and additional devices according to at least two predetermined rates in operation 1000. The additional devices may include an LCD panel, a camera, a speaker, and the like that provide functions and services executable in the mobile device, as described before. Two rates may be the transmission rates of data signals and control signals, that is, 7.5 Gbps and 3.75 Gbps, respectively, by way of example. However, signals may be classified according to more rates in various embodiments of the present disclosure.

In operation 1005, the mobile device transmits and receives the classified signals in transmission lines supporting the at least two rates, respectively. In the case of an I2C signal and a SLIMbus signal, the operation for transmitting classified signals is performed based on the configuration of a mobile device supporting I2C and SLIMbus according to each embodiment of the present disclosure. According to an embodiment of the present disclosure, differential signaling and common transmission mode component signaling may be applied to the at least two rates. For a transmission line for transmitting and receiving a control signal among the transmission lines, a switching signal indicating switching between transmission and reception may be transmitted to a device at an end of the transmission line on a separate channel or in predetermined pattern. In the mobile device, it is also possible to supply DC power to a device that is connected via a transmission line that has common mode component signaling. Details of these embodiments have been described before and thus will not be described to avoid redundancy.

A signal can be processed efficiently without the need for adding connection lines in a mobile device configured according to various embodiments of the present disclosure.

As is apparent from the foregoing description, a mobile device according to an embodiment of the present disclosure classifies signals transmitted and received between a main processor and additional devices that support additional functions using at least two predetermined rates, and transmits and receives the classified signals in transmission lines supporting those rates. Therefore, the number of connection lines and power consumption can be reduced during signal processing, and signals supporting other protocols and interfaces can be transmitted and received without the need for using additional connection lines in the mobile device.

While the disclosure has been shown and described with reference to certain exemplary embodiments thereof, it will be understood by those skilled in the art that various changes in form and details may be made therein without departing from the spirit and scope of the disclosure as defined by the appended claims and their equivalents.

What is claimed is:

1. A method for processing a signal in a mobile device, the method comprising:
classifying a plurality of data signals and a control signal for communication between an application processor and a video device in the mobile device, to a video path line supporting a first data rate and unidirectional communication, and to a control path line supporting a second data rate lower than the first data rate and time division duplex (TDD) bidirectional communication;
transmitting a switching signal indicating a change in communication direction in the video path line to a receiving mobile device prior to transmitting the classified signals, wherein the switching signal is transmitted by use of at least one of a separate channel and a signal having a predetermined pattern; and
communicating the classified signals via the video path line and the control path line,
wherein the video path line is configured to a first differential signaling pair of wires between the application processor and the video device, and
wherein the control path line is configured to a second differential signaling pair of wires, separate from the video path line, between the application processor and the video device.

2. The method of claim 1, wherein signals of differential signaling and signals of common mode signaling are simultaneously transmitted via the first differential signaling pair of the video path line.

3. The method of claim 1, wherein signals of differential signaling and direct current (DC) power are simultaneously transmitted via the first differential signaling pair of the video path line.

4. The method of claim 1, further comprising selecting one of a plurality of clock signals as a communication clock for use in communicating the classified signals.

5. The method of claim 4, wherein the communication clock, of the plurality of the clock signals, is slowest that can be used for use in communicating the classified signals.

6. The method of claim 4, wherein selecting the communication clock occurs at least one of periodically and upon a change in a communication state, and
wherein the change in the communication state comprises determining using a rate of the at least two predetermined rates not being presently used.

7. The method of claim 1, wherein communicating the classified signals comprises classifying a legacy protocol signal to one of the first and second data rates.

8. The method of claim 1, wherein, when a bidirectional communication is detected on a differential signal pair from among the plurality of data signals, signals on the differential signal pair are transmitted to the control path line via low power (LP) buffers.

9. A mobile device for processing a signal, the mobile device comprising:
a controller configured to:
classify a plurality of data signals and a control signal for communication between an application processor and a video device in the mobile device, to a video path line supporting a first data rate and unidirectional communication, and to a control path line supporting a second data rate lower than the first data rate and time division duplex (TDD) bidirectional communication, and
transmit a switching signal indicating a change in communication direction in the video path line to a receiving mobile device prior to transmitting the classified signals, wherein the switching signal is transmitted by use of at least one of a separate channel and a signal having a predetermined pattern; and
a transceiver configured to communicate the classified signals via the video path line and the control path line,
wherein the video path line is configured to a first differential signaling pair of two wires between the application processor and the video device, and
wherein the control path line is configured to a second differential signaling pair of two wires, separate from the video path line, between the application processor and the video device.

10. The mobile device of claim 9, wherein signals of differential signaling and signals of common mode signaling are simultaneously transmitted via the first differential signaling pair of the video path line.

11. The mobile device of claim 9, wherein signals of differential signaling and direct current (DC) power are simultaneously transmitted via the first differential signaling pair of the video path line.

12. The mobile device of claim 9, wherein one of a plurality of clock signals is selected as a communication clock for use in communicating the classified signals.

13. The mobile device of claim 12, wherein the communication clock, of the plurality of the clock signals, is slowest that can be used for use in communicating the classified signals.

14. The mobile device of claim 12, wherein the communication clock is selected at least one of periodically and upon a change in a communication state, and
wherein the change in the communication state comprises determining using a rate of the at least two predetermined rates not being presently used.

15. The mobile device of claim 9, wherein the transceiver is configured to communicate the classified signals by classifying a legacy protocol signal to one of the first and second data rates.

16. The mobile device of claim 9, wherein, when a bidirectional communication is detected on a differential signal pair from among the plurality of data signals, signals on the differential signal pair are transmitted to the control path line via low power (LP) buffers.

* * * * *